United States Patent
Anfinsen

(10) Patent No.: US 7,618,667 B2
(45) Date of Patent: Nov. 17, 2009

(54) HIGH PROTEIN, LOW CARBOHYDRATE DOUGH AND BREAD PRODUCTS, AND METHOD FOR MAKING SAME

(75) Inventor: Jon Robert Anfinsen, Alachua, FL (US)

(73) Assignee: Techcom Group, LLC, Gainesville, FL (US)

( * ) Notice: Subject to any disclaimer, the term of this patent is extended or adjusted under 35 U.S.C. 154(b) by 960 days.

(21) Appl. No.: 10/319,129

(22) Filed: Dec. 13, 2002

(65) Prior Publication Data

US 2003/0134023 A1   Jul. 17, 2003

Related U.S. Application Data

(60) Provisional application No. 60/340,541, filed on Dec. 13, 2001.

(51) Int. Cl.
A21D 10/00 (2006.01)
(52) U.S. Cl. ............... 426/549; 426/496; 426/551; 426/654; 426/656
(58) Field of Classification Search .......... 426/549, 426/496, 654, 656, 551
See application file for complete search history.

(56) References Cited

U.S. PATENT DOCUMENTS

| | | |
|---|---|---|
| 3,348,951 A | 10/1967 | Evans |
| 3,561,974 A | 2/1971 | Hansen |
| 3,574,634 A | 4/1971 | Singer |
| 3,655,403 A | 4/1972 | Vidal |
| 3,889,003 A | 6/1975 | Yourman |
| 3,897,568 A | 7/1975 | Johnson |
| 3,930,055 A | 12/1975 | Engelman et al. |
| 3,946,120 A | 3/1976 | Vincent et al. |
| 3,987,206 A | 10/1976 | Titcomb et al. |
| 3,992,554 A | 11/1976 | Blake et al. |
| 3,995,065 A | 11/1976 | Titcomb et al. |
| 4,109,018 A | 8/1978 | Thompson |
| 4,159,348 A | 6/1979 | Dogliotti |
| 4,198,438 A | 4/1980 | Singer et al. |
| 4,302,477 A | 11/1981 | Mendy et al. |
| 4,442,132 A | 4/1984 | Kim |
| 4,759,934 A | 7/1988 | Ferrara |
| 4,824,683 A | 4/1989 | Hodgson et al. |
| 4,950,496 A | 8/1990 | Schur |
| 4,961,937 A | 10/1990 | Rudel |
| 5,116,630 A | 5/1992 | Chen et al. |
| 5,133,984 A | 7/1992 | Murphy et al. |
| 5,138,038 A | 8/1992 | Katayama et al. |
| 5,178,894 A | 1/1993 | Rudel |
| 5,274,079 A * | 12/1993 | Katayama et al. ............ 530/372 |
| 5,403,610 A | 4/1995 | Murphy et al. |
| 5,458,902 A | 10/1995 | Rudel |
| 5,500,240 A | 3/1996 | Addesso et al. |
| 5,629,036 A | 5/1997 | Yanetani et al. |
| 5,698,256 A | 12/1997 | Stilling |
| 5,851,301 A | 12/1998 | Robertson et al. |
| 5,925,396 A | 7/1999 | Reed et al. |
| 5,928,700 A | 7/1999 | Zimmerman et al. |
| 5,932,269 A | 8/1999 | Huang et al. |
| 5,945,299 A | 8/1999 | von Kries et al. |
| 6,007,850 A | 12/1999 | Van Duijnhoven et al. |
| 6,039,997 A | 3/2000 | Mizoguchi et al. |
| 6,068,863 A | 5/2000 | Dupart et al. |
| 6,068,864 A | 5/2000 | Barrett et al. |
| 6,106,881 A | 8/2000 | Yajima et al. |
| 6,106,887 A | 8/2000 | Yamazaki et al. |
| 6,113,975 A | 9/2000 | Grace et al. |
| 6,174,559 B1 | 1/2001 | Shulman et al. |
| 6,210,702 B1 | 4/2001 | Samman |
| 6,221,418 B1 | 4/2001 | Bergenfield et al. |
| 6,248,375 B1 | 6/2001 | Gilles et al. |
| 6,291,009 B1 | 9/2001 | Cohen |
| 6,322,826 B2 | 11/2001 | Zohoungbogbo |

FOREIGN PATENT DOCUMENTS

CA   1.108.006   9/1981

(Continued)

OTHER PUBLICATIONS

Journal Name "Product Alert", ISSN-0740-3801, vol. 31, No. 6, Mar. 26, 2001.
Journal Name "Lookout Foods", ISSN-0740-3860, vol. XXIV, No. 5, Mar. 13, 2001, p. 44F.
Journal Name "Product Alert", ISSN-0740-3801, vol. 30, No. 3, Feb. 14, 2000.
Journal Name "Prepared Foods", ISSN-0747-2536, vol. 169, No. 1, 2000-01-00, p. 13.
Journal Name "Product Alert", ISSN-0740-3801, vol. 27, No. 21, Nov. 10, 1997.
Journal Name "Brot & Backwaren", 32 (1/2) 10, 15-16, 1984—Abstract.
Journal Name Khranitelna Promishlenost, 20 (2) 29-32 1971—Abstract.
Journal Name Getreide, Mehl und Brot. 28 (5) 121-124, 1974—Abstract.

*Primary Examiner*—Lien Tran
(74) *Attorney, Agent, or Firm*—Hasse & Nesbitt LLC; Daniel F. Nesbitt

(57) ABSTRACT

A dough composition for making a high protein, low carbohydrate bread, the dough containing at least 5% vital wheat gluten, a hydrolyzed wheat protein having a degree of hydrolysis from about 0.5% to 50%, a moisture-managing agent, a fungal protease enzyme, a carbohydrate component consisting of digestible carbohydrate material and non-digestible carbohydrate material, and water. A milk protein or soy protein hydrocolloid can be used as the moisture-managing agent to improve the shelf life of the resulting bread. A dough conditioner is used to improve the machinability of the dough composition, especially at less intense mixing conditions. The invention also includes a process for making the dough composition using high shear mixing equipment. The invention includes also the bread made from the dough composition, and from the dough making process.

18 Claims, No Drawings

FOREIGN PATENT DOCUMENTS

| | | |
|---|---|---|
| CH | 632133 A5 | 9/1982 |
| DE | 216085 | 11/1909 |
| DE | 646018 | 6/1937 |
| DE | 1442022 | 2/1969 |
| DE | 2336562 | 2/1975 |
| DE | 2438597 | 2/1976 |
| DE | 2747735 | 5/1978 |
| DE | 1522439 | 8/1978 |
| DE | 3026-598 A1 | 2/1982 |
| EP | 0011174 B2 | 5/1980 |
| EP | 0938845 A1 | 9/1999 |
| FR | 2.788.409 | 7/2000 |
| GB | 1.472.738 | 5/1977 |
| NL | 78-05360 | 11/1979 |
| WO | WO 01/93686 A1 | 12/2001 |
| WO | WO 01/95730 A1 | 12/2001 |
| WO | WO 01/95731 A1 | 12/2001 |
| WO | WO 03/000059 A2 | 1/2003 |

* cited by examiner

HIGH PROTEIN, LOW CARBOHYDRATE DOUGH AND BREAD PRODUCTS, AND METHOD FOR MAKING SAME

CROSS-REFERENCE TO RELATED APPLICATIONS

This application claims the benefit of co-pending U.S. Provisional Application No. 60/340,541, filed Dec. 13, 2001.

FIELD OF THE INVENTION

The present invention relates to low carbohydrate, high protein dough and bread products for use in standard and special diets designed to limit and control the intake of digestible carbohydrates, as well as to methods for making such doughs and breads.

BACKGROUND OF THE INVENTION

Diabetes or diabetes mellitus is a chronic disorder of glucose (sugar) metabolism caused by the body's inability to adequately produce or utilize insulin, a hormone produced and released from the pancreas, when blood sugar levels increase as a result of ingesting digestible carbohydrates. The diabetic condition is characterized by elevated blood sugar levels (normal blood sugar levels are between 70 and 100 mg/dL). There are two types of diabetic conditions: juvenile-onset diabetes (Type I) and the mature-onset diabetes (Type II). In Type I diabetes, the body does not produce insulin. The administration of insulin is necessary to lower blood glucose to normal levels. In Type II diabetes, either the body doesn't produce enough insulin or cells lose their ability to efficiently use insulin (insulin resistance) to facilitate the transport of glucose into cells. High levels of insulin from self administration or from over production by the body can cause obesity as well as the deterioration of general health. Excessive consumption of digestible carbohydrates over an extended period of time can lead to Type II diabetic conditions, while reducing digestible carbohydrate intake can often control Type II diabetic conditions without administering medications.

There are over 16 million Americans afflicted by diabetes. The American Diabetes Association predicts that a million more persons will be diagnosed with diabetes every year. Type II diabetes accounts for 90 to 95 percent of the cases. Type II diabetes has been known as mature-onset diabetes, and has been associated primarily with persons over 40. However, there has been a dramatic rise in Type II diabetes among people in their 30s, where the incidence of Type II diabetes has increased by 70 percent in the past decade. Children are now being diagnosed with Type II diabetes. This was unheard of a few years ago.

The high blood glucose levels and high blood insulin levels associated with excessive consumption of digestible carbohydrates can also lead to general health concerns. Eating three high carbohydrate meals a day plus snacks and beverages rich in carbohydrates can elevate glucose and insulin levels for upwards of 16 hours per day. High levels of insulin can lead to excessive deposits of adipose fat, resulting in obesity. Obesity is a cause of many health problems including cardiac disease. High blood insulin levels can lead to blindness, poor circulation, high blood pressure, kidney failure, heart disease, stroke, and deterioration particularly of the peripheral nerves of the feet and legs. Diabetes is the leading cause of blindness and kidney failure. It quadruples the risk of heart disease and is responsible for over 90,000 amputations per year in the U.S. Diabetes is the seventh leading cause of death in America.

A primary approach for reducing blood glucose levels is the strict adherence to a diet that minimizes postpriandal glucose response. However, compliance to a diet that results in normal blood glucose levels is difficult since the majority of foods consumed daily in a typical diet have a high level of digestible carbohydrates. Consequently, food products and dietary management systems are needed to help control and maintain blood glucose levels to as close to normal as possible, in order to reduce the incidence and complications of diabetes. More specifically, there is a need for low-carbohydrate versions of popular, highly consumed food products.

Bread products are abundantly consumed food products that have traditionally contained a high level of digestible carbohydrates. Digestible carbohydrates typically found in breads include starches, simple sugars, and complex sugars. Digestible starches and complex sugars are broken down by enzymatic hydrolysis into individual sugar molecules, which pass through the wall of the gastrointestinal tract and into the blood and lymph. This process is called absorption and takes place primarily in the small intestine.

In a conventional process to make a conventional yeast-leavened dough and resulting bread product, the proper proportions of wheat flour, water and yeast are combined, mixed, and kneaded to create a dough mass. The flour is the source of the proteins and carbohydrates found in a conventional bread. Standard bread flour used to make conventional bread is produced from hard wheat having a high gluten content (12 to 14 percent gluten protein). In the early stages of mixing dough, the two main gluten proteins found in wheat flour (gliadin and glutenin) hydrate and bind together to form gluten strands. As mixing continues, the gluten strands align and form inter-molecular bonds, resulting in a strong, elastic protein structure and a viscous, extensible and cohesive dough. This series of changes in protein structure is referred to as gluten development. The particulate flour, including starches, and fiber materials become entangled and enmeshed into the continuous protein film. The kneaded dough is then formed into the shape of a loaf, and allowed to proof. During proofing, yeast cells replicate and grow. The yeast cells ferment sugars contained in the dough mass to produce carbon dioxide gas, ethyl alcohol and water. The release of carbon dioxide gas within the dough mass is also referred to as leavening. The viscoelastic and film forming properties of the protein structure enable the dough to trap gas bubbles during leavening to form small cells throughout the dough mass. These gas bubbles cause the dough to rise, or to leaven, during proofing. The proofed dough is then baked to form the loaf of bread having the characteristic cellular structure.

A typical wheat flour used to make conventional bread contains about 12 percent protein, 70 percent digestible carbohydrate, 2.5 percent dietary fiber, and about 1.5 percent fat. Since high levels of wheat flour are used in conventional bread products, 12 to 16 grams of digestible carbohydrates are typically found in a 1 ounce (28.35 gm) slice of conventional bread. Other native grains having varying amounts of protein and carbohydrate have produced grain flours. The other grain flours have been used to make bread formulations that have resulted in a variety of bread products with dough and bread properties that vary in part based on the amount of gluten protein in the dough composition. When non-wheat bread flours having reduced or negligible gluten levels are used, it has been known to add an amount of wheat gluten protein to the dough composition, above the amount provided by the bread flours, to increase the gluten content reduced by the dilution of wheat flour. The addition of minor amounts of vital wheat gluten, or gluten flour, to conventional bread flours can improve the making of the dough, and vary the properties of the resulting bread. Vital wheat gluten, a wheat protein material derived from wheat flour and containing about 75-85% protein, has been added to conventional dough formulations at only low levels (from about 3-5% by weight of the bread flour) while maintaining a workable dough and acceptable bread. The addition of higher levels of vital gluten with bread flour results in changes in the dough characterized by the development of an increasingly tough, rubbery dough that is difficult to extend and stretch, and in a resulting bread product having an increasingly gluten-like characteristic, such as an open irregular crumb and a rubbery texture of both crust and crumb. U.S. Pat. No. 5,458,902, issued to Rudel on Oct. 17, 1995, teaches the addition of vital wheat gluten (about 80% gluten content) to bread flour (about 10-13% protein content), at levels of up to about 25% by weight of the bread flour, to produce a flour blend having a wheat protein content of about 17-30%, and using low heat non-fat dry milk solids, at a level of about 9% to 100% by weight of the flour blend, to improve the mixing, make-up and proofing of the dough, and the appearance and taste of the resulting bread product.

While others have produced dough and bread having reduced levels of carbohydrates, or higher levels of proteins, for dietary and nutritional purposes, there remains a need to develop dough and bread formulations that have a high level of protein and a low level of carbohydrate, particularly digestible carbohydrate, having improved structure, texture, and organoleptic properties that are comparable to conventional bread products.

BRIEF SUMMARY OF THE INVENTION

The invention provides a dough composition comprising a protein component, a carbohydrate component, and a liquid component comprising water. The protein component comprises a vital wheat gluten and a hydrolyzed wheat protein that form a protein core. The carbohydrate component comprises non-digestible carbohydrate and digestible carbohydrate. When processed, the protein core will interact with the carbohydrate component to form a dough that when baked will produce a food product with similar appearance and organoleptic characteristics to those of a conventional bread. The non-digestible carbohydrate material can comprise a dietary fiber, a non-absorbent carbohydrate material, or a mixture of both. The digestible carbohydrate materials comprise grain flours, legume flours, starches and other digestible carbohydrates such as simple sugars and complex sugars. Optional minor ingredients can include flavorings, leavening agents, preservatives and dough conditioning agents.

The present invention also provides for the use of a protein hydrocolloid as a moisture-managing agent in a bread dough composition to improve the shelf life of bread products produced from the bread dough composition. The protein colloid can be selected from a milk-based protein hydrocolloid such as caseinate, a soy-based protein, such as a soy protein isolate, and a mixture thereof. The use of milk-based and soy-based protein, while particularly beneficial in the processing of doughs and breads having a protein core comprising vital wheat gluten and hydrolyzed wheat protein, can be useful in the processing of conventional doughs and breads as well to improve moisture management and the shelf life of the bread.

The present invention also provides a dough powder composition for use in making a dough composition, comprising a vital wheat gluten, and an enzyme modified wheat protein.

The invention further provides a process for preparing a high protein bread dough having a major protein component. This process comprises the steps of combining dough ingredients comprising a vital wheat gluten, a hydrolyzed wheat protein, a carbohydrate material, and a liquid component comprising water, and applying high shear or intensive mixing to the dough ingredients to more fully hydrate the vital wheat gluten and other proteins so as to extend shelf life and to form an extensible, pliable, viscoelastic dough that has good bread properties.

The present invention relates to: a bread product that contains from about 20% to 100% less of digestible carbohydrate than conventional breads; a bread product that contains a majority portion of protein and non-digestible carbohydrate while containing a minor portion of digestible carbohydrate; a bread product with reduced levels of digestible carbohydrates that has the appearance and organoleptic properties of a conventional bread product, and that can satisfy the function and desire for bread in the diet; a food matrix containing a reduced level of digestible carbohydrate that emulates the organoleptic properties of a conventional bread; a food product and a method of its use for regulating physiological responses, including minimizing postprandial blood glucose levels, limiting insulin response, lowering blood nitrogen levels, promoting the growth of beneficial intestinal bacteria, and supporting regularity of defecation; a method for supplementing the diet by delivering, via a food matrix that contains a reduced level of digestible carbohydrates, one or more active ingredients such as proteins, amino acids, fats, dietary fibers (soluble and insoluble), non-absorbable carbohydrates, fermentable carbohydrates, vitamins, minerals, micronutrients, and phytonutrients, to promote health or treat disease.

DETAILED DESCRIPTION OF THE INVENTION

Definitions

As used herein:

a. "bread" includes ordinary loaf bread, toasts, buns, rolls, croissants, pretzels, pizza dough, English muffins, bread sticks, flat breads, pita breads, croutons, bread crumbs, sweet breads, muffins, doughnuts, chips and bagels. Unleavened bread is prepared without a leavening agent.

b. "glycemic index" (GI) is calculated by dividing the blood glucose incremental area under the curve (AUC) of the test food by the blood glucose AUC of the reference food and multiplying by 100, where the carbohydrate content of test and reference foods are the same. The reference food is typically glucose or white bread which has the standard GI of 100.

c. "conventional bread" is used herein to describe a conventional white loaf bread having the main constituents of wheat flour, water, salt, yeast, and vegetable oil, and includes standard commercial white breads loaves, such as Butternut® brand enriched white bread, manufactured by Interstate Brands Corp. of Kansas City, Mo., having 2 gm protein, 14 gm carbohydrate, and 1 gm fat per 30 gm slice.

Protein Component

The protein component comprises vital wheat gluten and a hydrolyzed wheat protein.

Vital wheat gluten (also known as gluten flour) comprises from about 65 to about 85 percent gluten protein on a dry basis. Vital wheat gluten is the water-insoluble complex protein fraction of wheat flours that can be manufactured from wheat flour by various processes, such as one disclosed in U.S. Pat. No. 5,851,301, issued Dec. 22, 1998, incorporated herein by reference. Vital wheat gluten forms a substantial portion of the structure of the dough mass, and provides as well the viscoelasticity properties of the dough.

The dough composition of the present invention comprises by weight at least about 5%, typically from about 10% to about 60%, more typically from about 15% to about 25%, vital wheat gluten. This is substantially higher (for example, up to about six times higher) than the level of gluten that is added from standard bread flour (at about 12% protein) to make conventional bread dough.

The present invention can optionally include standard bread flour, which typically contains about 10-13% protein. Preferred dough and bread compositions comprise a minor portion of standard bread flour, generally less than the portion of vital wheat gluten, and typically less than 50%, more typically less than about 25%, and most typically less than about 20%, by weight of the vital wheat gluten. The gluten contained in the dough composition is contributed by the vital wheat gluten and any standard bread flour or other wheat flour used in the dough formulation. Typically, the vital wheat gluten will contribute at least 60%, typically at least 75%, and more typically at least 90%, by weight, of the total gluten in the dough composition.

The vital wheat gluten can be hydrated in the presence of water. Preferred are vital wheat gluten materials which can pass the Gluten Hydration Test, described hereinafter in the Methods section. A preferred vital wheat gluten can be obtained commercially as Protinax 132 from Avebe America.

The hydrolyzed wheat protein is the second protein in a minor proportion to the vital wheat gluten. The presence of a hydrolyzed wheat protein significantly improves the viscoelastic properties and machinability of a dough having high levels (from about 5% to about 35% by weight of the dough composition) of vital wheat gluten. It has also been found that the addition of the hydrolyzed wheat protein improves the organoleptic properties of the bread product.

A typical hydrolyzed wheat protein is prepared from a wheat protein isolate or vital wheat gluten, having a protein content of from about 50% to about 100% protein, more typically from about 75% to about 90% protein. The hydrolyzed wheat protein can be made by enzymatically treating a wheat protein isolate (made by chemically adjusting wheat protein to its isoelectric point) to hydrolyze intramolecular peptide bonds within the protein molecules. The degree of hydrolysis is from about 0.5% to about 50%, more typically from about 1% to about 10%. A preferred hydrolyzed wheat protein comprises a wheat protein isolate containing about 85% to about 90% protein that is hydrolyzed about 1.0% to about 3%. Hydrolyzed wheat protein is available from Manildra Milling Company as IWP 1100.

The dough composition generally comprises from about 0.5% to about 10%, more typically from about 3% to about 6%, by weight, of the hydrolyzed wheat protein. The protein core typically comprises a weight ratio of vital wheat gluten to hydrolyzed wheat protein of from about 1:1 to about 8:1, and more typically from about 2:1 to about 5:1, and most typically from about 2.5:1 to about 3.5:1.

Bread product baked from a dough composition of the present invention having a protein component comprising essentially the above protein core containing vital wheat gluten material and hydrolyzed wheat protein material, has a bread-like structure that has a less rubbery texture, a less particulate or grainy mouth feel upon chewing, smaller cell structures, less opacity, and an appearance more like conventional bread, as compared to a similar bread product baked from a dough composition with a protein component that contains only the vital wheat gluten and none of the hydrolyzed wheat protein material. By comparison, a bread product baked from a dough composition with a protein component that contains only the vital wheat gluten and none of the hydrolyzed wheat protein material generally has a rubbery, particulate, grainy mouthfeel that is uncharacteristic of conventional bread, and lacks adequate moisture binding that is necessary to provide adequate shelf life.

The protein component typically further comprises a moisture-managing agent. The moisture managing agent reduces the level of free moisture contained in, and thus the water activity ($a_w$) of, the baked bread product. Water activity is expressed by the equation:

$$a_w = ERH/100$$

where ERH is the equilibrium relative humidity of a bread sample. It is well known that an edible product's water activity is a critical factor in the determination of the shelf life of the product, and especially for a baked bread product. A conventional bread product is known to have a water activity of from about 0.90 to about 0.95. In general, a lower water activity value for a bread product will retard the growth of molds, and can indicate that the product will have a longer shelf life before the onset of molding on the bread product under shelf storage conditions. It has been suggested that molds will cease to grow at water activities below 0.80. The use of moisture-managing agent, typically a protein hydrocolloid, in the dough and bread products of the present invention provides the bread product with a water of activity of more than about 0.80, and of less than about 0.95, and more typically in the range of from about 0.85 to about 0.90. The bread products have a longer shelf life based on the time to form mold on the surface of the bread loaf. The use of the protein hydrocolloid also improves the appearance of the bread structure.

Methods to measure the water activity of a bread are well known. For the present invention, the water activity should be measured on a bread slice sample that has cooled after baking and equilibrated at room temperature for at least two hours.

The moisture-managing agent can be selected from a milk-based protein hydrocolloid, a soy-based protein hydrocolloid, and a mixture thereof. A particularly preferred protein hydrocolloid is caseinate, selected from alkali metal caseinate, alkali earth metal caseinate, and mixtures thereof. The alkali metal caseinate is preferably sodium caseinate, potassium caseinate, or a mixture thereof. The alkali earth metal caseinate is preferably calcium caseinate, magnesium caseinate, or a mixture thereof. The dough composition typically comprises from about 0.1% to about 10%, more typically from about 0.5% to about 6%, and even more typically from about 1% to about 3%, by weight, of the caseinate. The caseinate is typically present at a weight ratio of hydrolyzed wheat protein to case mate of from about 10:1 to about 1:1, more typically from about 4:1 to about 1.5:1, and most typically about 2.5:1 to about 2:1. A particularly preferred caseinate, sodium caseinate, is supplied by Erie Foods International. Typically, the caseinate protein is processed to avoid excessive denaturing of the protein that can result in poor water absorption and water retention properties. More typically, the caseinate has a water absorption value of at least about 250%, and even more typically, of at least about 300%, according to the farinograph method, AACC Method 54-21A.

Another preferred soy-based protein hydrocolloid is selected from soy protein isolates and soy protein concentrates. Soy protein isolates having a high water absorption and high viscosity are particularly preferred. These soy protein isolate proteins are identified by their manufacturers as having a "medium" or "high" water absorption, and a "high" viscosity. Typically, these soy protein isolate proteins have a water absorption value of 200% and higher as determined by the farinograph method, AACC Method 54-21A, and a viscosity of 600 centipoise of more, as determined on a 15% solution with a Brookfield® viscometer at 25° C. and a shear rate of 10 sec$^{-1}$. A preferred soy protein hydrocolloid is the soy protein isolate Supro 620, available from Protein Technologies International of Saint Louis, Mo. Soy protein isolates also provide improvements in the machinability of the dough and organoleptic properties of the bread, including a soft and fine crumb structure and a broadening and mellowing of the flavor profile. The dough composition typically comprises from about 0.1% to about 10%, more typically from about 0.5% to about 6%, and most typically about 2%, by weight, of the soy protein isolate.

The water managing agent and the hydrolyzed wheat protein materials can be added separately or as co-processed ingredients, for example, by combining, slurrying with water, and drying the mixture.

The protein component also typically further comprises a protease, and more typically a fungal protease. A preferred protease, Fungal Protease 31, is supplied by Valley Research Inc. The protease is believed to hydrolyze intermolecular and intramolecular peptide bonds of the gluten proteins, which enhances the interaction of the gluten proteins to promote protein film integrity needed to achieve small and consistent cell structures within the bread matrix. The fungal protease is used at a level of at least about 0.001%, typically from about 0.01% to about 1.0%, and more typically from about 0.01% to about 0.1%, by weight of the dough composition.

The invention also includes a dough powder composition for use in making a dough composition comprising a vital wheat gluten and a hydrolyzed wheat protein. The blended powder would provide the two components as a single ingredient in the appropriate proportions for use in making dough and bread products with a higher protein content. The dough powder composition can also further comprise a moisture-managing agent, such as soy protein isolate or caseinate, and a protease enzyme, such as a fungal protease.

A bread product baked from the dough having the core protein component comprising vital wheat gluten, hydrolyzed wheat protein, water managing agent and fungal protease enzyme, has a good appearance and texture, with small, more opaque cells that are very characteristic of the appearance and color of conventional bread.

Carbohydrate Component

The dough composition of the present invention also comprises a carbohydrate component selected from digestible carbohydrate material, non-digestible carbohydrate material, and mixtures thereof. The non-digestible carbohydrate material can comprise a dietary fiber, a non-absorbent carbohydrate material, or a mixture thereof. Included within dietary fiber is a resistant starch which has dietary fiber properties and is non-digestible. The dough composition generally comprises from about 5% to about 65%, more typically from about 10% to about 30%, by weight of the carbohydrate component.

The dough composition of the present invention can comprise, by weight, from about 0% to about 50%, more typically from about 0% to about 15%, of the digestible carbohydrate material, and from about 5% to about 40%, more typically from about 5% to about 20%, of the non-digestible carbohydrate material.

The non-digestible material can comprise, by weight, from about 0% to about 100%, more typically from about 30% to about 40%, of the non-absorbent carbohydrate material, and from about 0% to about 100%, more typically from about 55% to about 65%, of the dietary fiber.

The digestible carbohydrate material comprises materials that can be digested to simple sugars (i.e., mono-saccharides) and are absorbed primarily in the small intestines prior to the colon. The digestible carbohydrates can be from one or more flours, starches and saccharides that are sourced from a variety of grains or legumes, other starches, and complex and simple sugars. Digestible carbohydrate materials in the form of bread flours include, but are not limited to, wheat flour, starch, whole wheat flour, wheat bran, rye flour, Miller's bran flour or corn meal flour. Digestible carbohydrate materials in the form of complex and simple sugars includes monosaccharides such as dextrose; disaccharides such as sucrose, invert sugar, and maltose; oligosaccharides such as malt syrup, molasses, fructose, corn syrup, and high fructose corn syrup; and high chain length carbohydrates such as starch.

The bread product of the present invention can provide significantly fewer digestible carbohydrates than a conventional bread product. The bread product typically comprises about 7.0 grams and less of digestible carbohydrate per 28.35 gm serving of bread product. The bread product can preferably comprises about 5.0 grams and less of digestible carbohydrate per 28.35 gm serving. One embodiment of a bread product comprises more than about 3.0 grams and about 7.0 grams and less of digestible carbohydrate per 28.35 gm serving. Another embodiment of a bread product comprises more than about 3.0 grams and about 5.0 grams and less of digestible carbohydrate per 28.35 gm serving. Preferably, the present bread products contain about 3.0 grams and less, more preferably about 2.0 grams and less, of digestible carbohydrate per 28.35 gm serving of bread product.

The definition of dietary fiber varies significantly throughout the world. Some countries establish fiber claims based on the results of analytical testing while others use labeling directives that are backed by physiological data. Contributing to the variability of dietary fiber labeling is the lack of standardized testing procedures and the inconsistent use of labeling directives. One acceptable definition is that dietary fibers are primarily carbohydrates that resist digestion by the alimentary enzymes of humans. The present invention defines a dietary fiber by the analytical definition that identifies and quantifies dietary fibers by AOAC methods 985.29 and 991.43. This definition encompasses macroconstituents of foods that include cellulose, hemicellulose, lignin, gums, modified celluloses, mucilages, oligosaccharides, and pectin. Examples of dietary fibers commonly used include cellulose, hemicellulose, lignin, gums, modified celluloses, mucilages, oligosaccharides, and pectins. A dietary fiber according to the present invention can also include a resistant starch having a high amylose content, although this material may not be classified as a dietary fiber by some authorities. Specific examples of dietary fiber sources include gum arabic, carboxymethylcellulose, guar gum, gellan gum, gum acacia, citrus pectin, low and high methoxy pectin, modified cellulose, oat and barley glucans, carrageenan, psyllium, soy polysaccharide, oat hull fiber, pea hull fiber, soy hull fiber, soy cotyledon fiber, sugar beet fiber, cellulose, and corn bran, as well as hydrolyzed forms of the listed fibers and encapsulated forms of the listed fibers, and any combination thereof. Numerous commercial sources of dietary fibers are readily available and known to one practicing the art. Gum arabic, hydrolyzed carboxymethylcellulose, guar gum, pectin and the low and high methoxy pectins are available from TIC Gums, Inc. of Belcamp, Md. and Gum Technologies Corp., Tucson, Ariz. Resistant high-amylose corn starch is available from Penford Starch, Englewood, Colo. The oat and barley glucans are available from Mountain Lake Specialty Ingredients, Inc. of Omaha, Nebr. Psyllium is available from the Meer Corporation of North Bergen, N.J. Carrageenan is available from FMC Corporation of Philadelphia, Pa.

Non-absorbent carbohydrates (also known as non-digestible oligosaccharides) possess many of the characteristics of fibers but are not quantified by the AOAC methods 985.29 and 991.43 as dietary fiber. Chemical modification of starch can ultimately affect its rate and extent of digestion in the small intestine. Partial hydrolysis of starch using acid and heat results in molecular rearrangement of the starch molecule such that alpha and beta-(1,2) and -(1,3) linkages are formed in addition to reconfiguration of existing alpha-(1,4) and -(1,6) bonds into beta bonds. For example, corn starch treated with hydrochloric acid, amylase and heat produces a low molecular weight indigestible dextrin (distributed by Matsutani Chemical Industry, Hyogo Japan under the product name Fibersol II) which is not digested in the small intestines prior to the colon, but is fermented in the colon. Examples of non-absorbent carbohydrate materials suitable for use in the present invention include fructooligosaccharides (FOS) available from Golden Technologies Company of Golden, Colo., xylooligosaccharides (XOS) available from Suntory Limited of Osaka, Japan, alpha glucooligosaccharides (GOS) available from Solabia, Pantin Cedex, France, trans galactosyl oligosaccharides (TOS) available from Yakult Honsha Co., Tokyo, Japan, soybean oligosaccharides from Calpis Corporation distributed by Ajinomoto U.S.A. Inc., Teaneck, N.J., lactosucrose, hydrolyzed inulin, and polydextrose available from A. E. Staley in Decatur, Ill. Inulin is available from Imperial Sensus as Inulin HD. Inulin is usually purified from plants such as chicory, Jerusalem artichoke, leek and asparagus. Various procedures for extracting the inulin have been reported. Usually the steps include chopping up the plant and extraction of the inulin. Inulin and pyrodextrin are particularly preferred since these materials function more like a starch material in the formation of a bread-like bread structure.

Liquid Component

The dough composition also comprises a liquid component comprising water. Water is the main vehicle to combine and mix the dry ingredients in order to prepare a homogenous, viscous dough mass. The water is also required to hydrate the protein components. The hydration of gluten is necessary in order for gluten to develop its viscoelastity characteristics required for proper film formation. A water temperature in the range of about 65° F. to about 75° F. (about 18° C. to about 24° C.) is preferred. Water can be added per se or as a component of other aqueous liquids, such as milk. The dough can comprise, by weight, from about 25 to about 40%, more typically from about 30 to about 37%, water.

The liquid component can also optionally comprise an edible oil. The oil is present to provide nutrition and provide improved machineability of the dough. Examples of suitable oils include corn oil, soybean oil, canola, and sunflower. The dough composition can comprise, by weight, from about 0% to about 15%, more typically from about 2% to about 5%, of liquid oil.

Optional Dough Components

The dough composition of the present invention can optionally include a leavening agent. Yeast is an important and well-known leavening agent used in bread making. Chemicals such as baking powder, tartaric acid and its potassium salt, and baking soda are also used to leaven bread. Without leaving, breads would remain flat. These breads are referred to as "flat breads" or "wafers".

The dough compositions can also comprise other non-gluten forming protein sources. Examples of such other proteins include whey, milk protein, soy protein, pea protein, rice protein, corn protein, egg protein, hydrolyzed protein and mixtures thereof. Commercial sources for the proteins listed above are readily available and known to one practicing the art. For example, whey, hydrolyzed whey and milk proteins are available from New Zealand Milk Products of Santa Rosa, Calif. Soy and hydrolyzed soy proteins are available from Protein Technologies International of Saint Louis, Mo. Pea protein is available from Norben Company of Willoughby, Ohio. Rice protein is available from California Natural Products of Lathrop, Calif. Corn protein is available from Ener-Genetics Inc. of Keokuk, Iowa. The optional other protein sources can comprise, by weight, from about 0% to about 20%, more typically from about 2% to about 10%, of the dough composition.

The dough compositions of the present invention can also include optional materials conventionally used in bread manufacturing, such as crumb softeners, reducing agents, and oxidizing agents, with normally expected results. Oxidizing agents are well-known as conventional additives for the improvement of loaf volume. Examples of commercially employed oxidizing agents include potassium bromate, ascorbic acid, azodicarbamide (ADA), and the like. The following levels of oxidizing agents are used commercially: potassium bromate, 40-75 ppm; ADA, 20-45 ppm; and ascorbic acid, 50-200 ppm. Two or more oxidizing agents can be used in combination, in which case levels are employed at the lower end of the above-listed ranges.

Dough compositions can also comprise a dough conditioner to improve formation of the dough. A dough conditioner is particularly useful when commercially processing a bread formulation on conventional, low-shear bread dough mixers. Dough conditioners are used in the bread-making industry to adjust the dough properties and machinability of a formulated bread dough, typically to accommodate for commonly-encountered variations in the functionality and performance of the base formulation components, such as the flours and added protein fractions. A typical dough conditioner can be selected from a lecithin, an enzyme-hydrolyzed gluten, a wheat gluten having reduced disulfide bonds, and a mixture thereof. A typical lecithin dough conditioner is Lecimulthin 150, supplied by Lucan Meyer, Decatur Ill. A typical enzyme-hydrolyzed gluten conditioner includes HWG 2009, available from MGP Ingredients, Inc. Preferred are enzyme-hydrolyzed glutens having a low level of peptides containing terminal hydrophobic amino acids, which are believed to impart a slight bitter taste. A typical wheat gluten having reduced disulfide bonds can be made by chemically reducing the intramolecular disulfide bonds in wheat gluten with sodium metabisulfite, and is available as Arise™ 5000 from MGP Ingredients, Inc. The dough composition typically comprises from about 0.1% to about 10%, more typically from about 0.5% to about 5%, and even more typically from about 2.0% to about 5% of dough conditioner.

The dough compositions and bread products of the present invention can optionally include vitamins, minerals and other micronutrients. Vitamins and minerals are understood to be essential in the daily diet. Those skilled in the art recognize that minimum requirements have been established for certain vitamins and minerals that are known to be necessary for normal physiological function. Appropriate additional amounts of vitamin and mineral ingredients need to be provided to the dough compositions to compensate for some loss during processing (baking) and storage of the bread products. Vitamins and minerals can include the vitamins A, $B_1$, $B_2$, $B_6$, $B_{12}$, C, D, E, K, beta-carotene, biotin, folic acid, pantothenic acid, and niacin; the minerals calcium, magnesium, potassium, sodium, phosphorous, and chloride; the trace minerals iron, zinc, manganese, copper, and iodine; the ultra trace minerals chromium, molybdenum, selenium; amino acids; and phytonutrients.

The dough compositions and bread products of the present invention can also optionally include sweeteners and flavorings to enhance the organoleptic quality of the bread product. Typical sweetening agents that are well-known in the art include both monosaccharide, disaccharide, and oligosaccharide sugars such as sucrose, invert sugar, dextrose, malt syrup, honey, maltose, molasses, fructose, corn syrup solids, and high fructose corn syrup. Preferred sweetening agents include sucrose, dextrose, corn syrup solids and high fructose corn syrup. Artificial sweeteners, such as sucralose, can also be used.

Salt is another commonly used and well-known ingredient that can be used in the preparation of the dough compositions and bread products of the present invention.

Another optional material is a carbohydrate-based hydrocolloid, which can include xanthan, locust bean, and cellulose gum, available from Gum Technologies.

Yet another optional material is a humectant. These materials have minimal effect on glycemic response and are generally not digestible. Humectants hold free water, and help prevent a bread product from drying out. However, humectants do not tightly bind the water, such that the use of a humectant does not significantly reduce the water activity of the bread product to improve the bread shelf life. Preferred humectants include polyols such as glycerol, manitol, and sorbitol.

Conventional shortening materials are suitable for use as an optional shortening ingredient of the dough mixtures of the present invention. Such conventional shortening materials are well-known to the ordinarily skilled artisan. Included within the definition of shortenings are materials such as margarines. Either liquid or solid shortenings of animal, vegetable, marine or synthetic oil origin can be used. A preferred shortening material is corn oil.

The dough composition and bread products of the present invention can also comprise a preservative as a food ingredient that can improve or extend shelf life in breads. Preferred preservatives include, but are not limited to, calcium propionate, calcium sorbate, citric acid, ascorbic acid, sodium erythorbate, and mixtures thereof. A preservative may be more appropriate when used in doughs produced by mixing methods other than high shear mixing.

Dough Processing

The protein component of the dough of the present invention is significantly different from that of conventional bread, or from that of dough made with reduced wheat flour supplemented with low levels of vital wheat gluten. In conventional bread dough, it is believed that the starch from the bread flours interacts with and enmeshes with the gluten film structure, which contributes to the three-dimensional structure of standard breads. Vital wheat gluten is the majority protein material in the dough of the present invention. To form an acceptable dough mass and baked bread product from the gluten-rich protein component of the present invention, the protein system needs to interact synergistically with other dough ingredients that are typically uncommon in the bread making process, and which comprise only a small portion of the flour used in a conventional bread.

High levels of gluten in a dough system have been known to make a stiff, tough, bucky dough that is difficult to properly divide and shape, and has extended proofing time with potentially reduced loaf volume. The dough of the present invention is formed by combining or mixing, and mechanically working under high shear, the dry and liquid ingredients into a dough mass. Achieving hydration of the bread ingredients, particularly the proteins, is important in the early stages of mixing. As hydration occurs, a dough is formed. Rapid and complete hydration of the gluten protein is particularly important during the mixing of the dough in the present invention, given the high proportion of vital wheat gluten used in the dough composition.

The two main proteins found in gluten, gliadin and glutenin, are coiled or folded structures that are stabilized by disulfide bonds that link intramolecularly to adjacent portions of the protein molecule. Mixing causes the molecules of proteins to stretch, which begins to break the relatively weak intramolecular bonds. Continued mixing develops the gluten strands by further stretching and breaking the intramolecular bonds of the gluten molecules, which then begin to bond intermolecularly with adjacent molecules. As intermolecular bonding increases, long, parallel elastic gluten strands form to give the protein structure and the dough its viscoelastic properties. A proper balance between intramolecular bonding and intermolecular bonding achieves the optimum viscoelastic and film forming properties required for proper bread structure and gas retention. The formation of a proper film is required to trap gases created by aeration from mixing and those generated by leavening. If dough is overworked, resulting in few intramolecular bonds, a strong inelastic dough is produced that has poor film forming properties. Mixing time and the rate of energy input (power) are important parameters that control the formation of the proper viscoelastic dough properties during mixing.

An important ingredient in the dough composition of the present invention is the hydrolyzed wheat protein, which significantly improves the machinability of the dough while providing a bread that has organoleptic characteristics similar to those of conventional bread. Without being bound by any theory, the hydrolyzed wheat protein appears to act as an interrupter within adjacent strands of vital gluten. The hydrolyzed wheat protein molecules are themselves wheat gluten molecules which have been treated with protease enzymes to hydrolyze intramolecular peptide bonds. The enzyme modified protein strands are distributed among the developing gluten strands. The enzyme hydrolyzed molecules are believed to "interrupt" the vital wheat gluten strands by weakening their intramolecular bonds during gluten development, resulting in a protein system that is less rubbery. The less rubbery protein system results in improved bread texture compared to when vital wheat gluten is used alone; the bread crumb is similar to conventional bread in that it is more tender, not rubbery, and does not give a grainy or particulate mouth feel. It is further thought that the breaking of peptide bonds in the enzyme modified protein creates reactive protein strands that can interact intermolecularly with vital gluten strands, thus maintaining the strength and integrity of the viscoelastic film when the strong rubbery nature of the vital gluten is reduced by the addition of the hydrolyzed wheat protein. The weight ratio of hydrolyzed wheat protein to vital wheat gluten, and the degree of hydrolysis of the hydrolyzed wheat protein, can be adjusted to achieve the optimum dough structure that provides an acceptable rubbery texture and dough machinability. It has been found that using a higher degree of hydrolysis in the hydrolyzed wheat protein can result in a slight bitter taste, and in a tendency for the dough mass to tear, instead of stretch, when extended. It is believed that the hydrolyzed wheat protein molecules with the higher degree of hydrolysis create points of weakness in the protein matrix, which result in tearing when the dough is extended.

The combination of the vital wheat gluten and the hydrolyzed wheat protein produces a dough that is strong, pliable, and extensible, that is machineable, proofs well, and which forms during an optional leavening step and after baking, a bread structure similar in appearance and color to that of a conventional bread product. The inventor has found that this bread product has a reduced ability to manage moisture (bind water) when compared to that made with vital wheat gluten alone.

The inventor has further discovered that by employing a moisture-managing agent, this deficiency in moisture management can be eliminated. Employing the moisture-managing agent significantly extends the product shelf life of the resulting baked bread product. The bread products herein made using a moisture-managing agent also experience limited side wall collapse or weakening that can result from free moisture causing a soggy crumb structure having reduced strength.

Bread products of the present invention employing a moisture-managing agent has a demonstrated shelf life out to 8-12 days, without the use of any preservative, when stored at room temperature, at about 60% relative humidity, and without any packaging. Similar shelf life is shown under typical commercial shelf conditions. Conventional bread products that use a conventional preservative material have, by comparison, a shelf life of about 10-14 days under typical commercial shelf conditions. In general, the shelf life of a bread product will depend on many factors, including (but not limited to) the water activity of the bread product, the type and thickness of the plastic bag or other material that contains the bread, and the humidity and temperature conditions of the shelf test area. The use of plastic storage bags with highly effective moisture barriers can prolong the shelf life of any bread product significantly. Consequently, the effect of ingredient formulation or process changes between two breads products upon shelf life can be compared, but may not be absolute, assuming that all external factors are equal.

Hydration of the protein system of the present invention using conventional low shear mixers may not provide sufficient degree of hydration or sufficient breaking of the intramolecular bonds, and hence the necessary dough structure for good dough working and for forming an acceptable bread product with good shelf life. Examples of a conventional low shear mixer include a Peerless or Hallmark Brand mixer, available from Peerless Machinery Company, Sidney, Ohio, and the horizontal blender shown on page 593 of Baking Science and Technology, Third Edition, Sosland Publishing Co., Merriam, Kans. Higher shear or more intense mixing affects the rate of hydration and the extent of hydration of the gluten proteins and other ingredients in the dough mass, and the breakage of the relatively weak intramolecular bonds. Less intense mixing conditions, such as that delivered with a conventional high intensity horizontal bar mixer, can be used by employing additional types or increased levels of dough conditioners to assist in breaking or weakening of the intramolecular bonds.

The high shear mixing has other advantages in the dough making process of the present invention. High shear mixing reduces the amount of time needed to produce a finished dough. Typically 250-pound (about 114 kg) batches of invention dough can be mixed in a high shear mixer (1800 rpm) in two minutes. Mixing the same quantity of dough in conventional mixers has taken as long as 20 minutes. Processing smaller quantities of dough during short periods of time to maintain a constant production rate is beneficial when line stoppages occur and dough must be held too long to make a quality product. Higher scrap levels are experienced under these conditions when larger batches requiring longer mix times are used to maintain needed production rates. In the case of frozen dough it is desirable to get product to the freezer in the shortest time from when the mixing of ingredients starts. Shortening the time to the freezer limits the amount of yeast that has begun to grow, and ensures a higher survival proportion in the resulting frozen dough.

One preferred high sheer mixer is a UM 44 manufactured by the Stephan Machinery Company. This vertical mixer has a bowl capacity of 45 liters and a bottom-mounted mixing element having a 6-inch (about 15 cm) blade, driven at speeds of up to 1800 rpm (revolutions per minute) during the dough mixing process. A preferred continuous dough mixer is a TK 160 horizontal mixer having two or three 6-inch (about 15 cm) blades that is manufactured by Stephan Machinery Company, Hameln, Germany.

To achieve the low level of digestible carbohydrates, non-absorbent carbohydrates and dietary fibers are used at levels that importantly impact the processing of the dough composition. Preferred non-absorbent carbohydrates and dietary fibers will interact well with the protein system to produce a good dough structure. A preferred non-absorbent carbohydrate is selected from inulin, pyrodextrin, and mixtures thereof. A preferred dietary fiber is selected from resistant high-amylose corn starch, wheat fiber, and mixtures thereof. It has also been found that the dough structure and properties are improved when using particulate dietary fibers having an average particle size of less than about 250 microns, more typically of less than about 50 microns.

In a preferred embodiment, the ingredients are loaded into the mixer bowl. Ingredients can be added in any order, though typically the liquid components are added first, followed by the dry ingredients. The mixer is turned on and achieves a speed of about 1800 rpms. Total mixing time can range from about 80 to about 140 seconds, typically from about 90 to about 110 seconds. The resultant dough temperature will vary depending on the temperature of the ingredients, the degree of hydration, and the mixing time. Ingredient temperatures ranging between about 50° F. (10° C.) and 70° F. (21° C.) can result in final dough temperatures in the range of about 75° F. (24° C.) to 95° F. (35° C.).

During the initial development of the dough, the gluten molecules begin to hydrate, the intermolecular bonds begin to break, and intermolecular bonds begin to form. During this initial period of time, the power that is consumed to apply the high shear mixing gradually increases with time. As the breaking of intramolecular bonds and forming of intermolecular bonds continues, the power reaches a first maximum power. The first maximum power point is also the first inflection point on the power-time curve, where the amount of power then begins to decrease. Gradually, as the gluten molecules become more flexible (as the intramolecular bonding has progressed), the power continues to decrease toward a second inflection point, or second minimum power, where the power will reach a minimum level. If the mixing is permitted to continue further, as the number of intermolecular bonds begins to increase significantly, the power will again begin to increase in level above the second minimum power. It has been found that a preferred dough structure is formed when the applied high shear mixing is terminated prior to reaching the time when the second minimum power is attained. For a given dough composition and batch size, a power ampmeter attached to the drive motor of the high shear mixer can be used to monitor and determine the absolute power reading for the first maximum power and the second minimum power, and the time period at which the first maximum power and the second minimum power occur.

After mixing has been completed the dough mass is passed through a divider to create a mass of dough that has a consistent desired weight. The dough pieces are allowed to recover or rest in a proofer for 8 to 10 minutes. Proofing can enhance the quality of dough, since the resting without applied shear allows the reforming of intramolecular and intermolecular bonds, thereby re-balancing and equilibrating the dough structure. After the first or any intermediate proofing steps, each piece of dough is then shaped, molded and placed into a baking pan. The dough then travels through a final proofer that allows the dough to rise for about one-half hour to an hour under controlled temperature and humidity conditions. Generally, the dough composition of the present invention "proofs" more quickly than, and has a proofing time shorter than that of, conventional bread doughs.

Baking involves placing the resulting bread dough into a suitable oven heated to a temperature of generally from about 325° F. (163° C.) to about 350° F. (176° C.), and baking until the internal temperature of the bread product reaches about 205° F. (96° C.), generally in about 35 minutes. The specific oven temperatures and baking times will depend upon the type of oven used.

The dough compositions of the present invention can be fresh baked into a bread product, or can be frozen and sold commercially for re-constitution and baking in the home or in institutional facilities.

The bread products of the present invention have a high level of protein, and a low level of digestible carbohydrate. Although the bread products are made from doughs having very low levels of standard bread flour, and high levels of proteins and vital wheat gluten, the bread cell structure and organoleptic properties are comparable to conventional breads. In a standard 28.35 gm slice serving, the bread product comprise at least 5 gm, preferably at least 7 gm, proteins, less than about 3.0 gm, more preferably less than about 2.0 gm, digestible carbohydrate; and at least 0.25 gm, more typically at least 0.5 gm, moisture-managing agent.

All percentages, parts and ratios used herein are by weight unless otherwise specified.

Methods

The following method is used to select a preferred vital wheat gluten for use in the present invention.

Gluten Hydration Test

1. Twenty (20) grams of a sample of vital wheat gluten powder and 35 ml of water are mixed together in a 500 ml beaker using a spoon or glass rod for 60 seconds, or until all dry product is hydrated and a gluten ball is formed.
2. An additional 50 ml of water is added to the beaker and the mixture allowed to set for 60 minutes.
3. The gluten ball is removed from the beaker, and excess water is squeezed from the gluten ball by hand.
4. Holding the gluten ball in both hands, the edges are slowly pulled as the gluten ball is rotated, to form a stretched film in the center of the gluten ball, avoiding any abrupt pulling that can cause premature tearing of the film that is forming. A preferred vital wheat gluten will form a gluten ball that can be extended upon slow pulling to a fine opaque film, without easily tearing or breaking after moderate extensions.

Digestible Carbohydrate Determination

The amount of digestible carbohydrate in a bread sample is determined by feeding the bread sample to a human subject and determining his/her blood glucose response. The blood glucose response for the sample is then used to determine, from a standard blood glucose response curve for glucose, the level of glucose (digestible carbohydrate) that will give the same blood glucose response as the bread sample.

The following method is used to determine the grams of digestible carbohydrate in a bread serving or sample:

The standard blood glucose response curve for glucose is based on the results of 9 human subjects. Triplicate assay results are determined for each level of glucose used to establish the standard blood glucose response curve. Each human subject should be a healthy subject who does not have a known metabolic disorder. A human subject's baseline blood glucose level and blood glucose response to a glucose standard are determined after a 12-hour overnight fasting period. The response curve is prepared by each subject consuming 50 ml of an aqueous glucose solution containing an amount of glucose, followed by measuring the subject's blood glucose response each 15 minutes during the following two-hour period. The amounts of glucose used to create the curve are 1.00 grams, 3.00 grams and 10.00 grams. The blood glucose response levels are based on measurement of capillary whole blood. Blood glucose concentration is determined using a YSI 23A blood glucose analyzer and oxygen electrode (Fullerton, Calif.). The incremental area under the curve (IAUC) is calculated as the area of the response above the baseline.

A standard blood glucose response curve for glucose is obtained by plotting for each of the human subjects the blood glucose response (in IAUC units) versus grams of consumed glucose (i.e., for the 1.00 gram, 3.00 grams, and 10.00 grams of glucose). The regressed results for all subjects used in the preparation of the standard curve should fall within a 90% confidence limit. Outlying subjects are eliminated. The "standard blood glucose response curve for glucose" for the human subject pool is plotted as a curve on a graph with a y axis labeled "blood glucose response" in IAUC units, and an x axis labeled "grams glucose" in grams.

The sample blood glucose response for the bread is similarly measured after consumption of the bread sample and the ingestion of 50 ml of tap water. Bread samples of about 30 gram samples (weighed to 0.01 grams) are consumed by three randomly-selected human subjects from the standard pool that have participated in the preparation of the standard blood glucose response curve for glucose. Triplicate test results are obtained. The sample blood glucose response for bread of each subject and each replicate is normalized to the response for a standard bread slice of 28.35 grams, by multiplying the response (in IAUC units) by 28.35 and dividing by the weight of the consumed bread sample in grams, to give a normalized response for the bread sample. The nine normalized blood glucose responses for bread samples for the three subjects and their replicates are averaged. A result outlying 90% confidence is eliminated. The resulting average normalized blood glucose response (on the y axis of the graph) for the bread is then extrapolated onto the standard blood glucose response curve for glucose, to determine the normalized level of glucose (in grams, on the x axis) in a standard serving of the bread.

The normalized level of glucose is the grams of digestible carbohydrate in a 28.35 gram serving of the sampled bread.

EXAMPLES

The following examples, while not limiting, serve to further illustrate the invention.

Example 1

The white bread dough formulation shown in Table I was combined (total batch size of about 11.5 kg) using a high sheer Stephan mixer with two 6-inch (15 cm) blades at 1800 rpm to produce dough. A first maximum power was attained at about 60-70 seconds. The high shear mixer was turned off at 90 seconds, just prior to achieving the second minimum power. The dough was divided into 1.5 pound (about 0.7 kg) pieces that are rested for 10 minutes prior to shaping. The shaped dough pieces were placed in 4 inch×8 inch×4 inch (about 10 cm×20 cm×10 cm) baking pans, and baked in a convection oven at 375° F. (about 191° C.) for 35 minutes or until an internal temperature reaches about 210° F. (99° C). The dough lost about 11% by weight in moisture during baking. The resulting white bread product provided about 3.0 grams of digestible carbohydrates per 28.35 gram serving.

TABLE I

| | Ingredient | Formula Percent |
|---|---|---|
| 1. | Instant active Yeast | 1.03 |
| 2. | Water | 37.50 |
| 3. | Iodized table salt | 1.03 |
| 4. | High Gluten Bread Flour | 4.29 |
| 5. | Wheat fiber | 4.29 |
| 6. | Vital Wheat Gluten | 19.27 |
| 7. | Hydrolyzed Wheat Protein: Caseinate co-powder | 6.42 |
| 8. | Corn Oil | 4.29 |
| 9. | Resistant Corn Starch-60 percent dietary fiber | 6.42 |
| 10. | Fungal Protease | 0.04 |
| 11. | Inulin | 5.50 |
| 12. | Lecithin | 0.30 |
| 13. | Whole Wheat Flour | 4.294 |
| 14. | Soy Flour-full fat | 4.294 |
| 16. | Baked Bread Flavor | 1.03 |
| | Total | 100.00 |

The instant active yeast ingredient was available from Red Star Yeast & Products, Milwaukee, Wis. The high gluten bread flour was available from Bay State Milling Company as Primo-Gusto Hi Gluten, product 493000 W, grade H50. The fine ground wheat fiber was available from J. Rettenmaier USA LP, Schoolcraft, Mich. as WF600. The 75% vital wheat gluten, which passed the Gluten Hydration Test, was available from Avebe America as Protinax 132. The hydrolyzed wheat protein—caseinate co-powder was available from Manildra Milling Company as IWP 1150, having a weight ratio of 7:3 of a hydrolyzed wheat protein (about 3% hydrolyzed and 85% gluten content) and sodium caseinate. The corn oil was available from Ventura Foods as Corn Salad Oil, no. 11438. The resistant high-amylose corn starch was available from Starch Australia Ltd. (now Penford Starch) as Hi-Maize® 1043. The fungal protease was available from Valley Research, Inc. as Fungal Protease 31 Dedusted. The inulin was available from Imperial-Sensus LLC of Sugar Land, Tex. as Frutafit® HD. The lecithin was available from Lucas Meyer, Inc. as Lecimulthin® 150. The whole wheat flour was available from ConAgra Flour Milling Company as Medium Whole Wheat Flour. The soy flour was available from U.S. Soy as non-GMO Full Fat Enzyme Active Soy Flour, code 10607/10507. The baked bread flavor was available from Givaudan Flavors Corp. as product specification no. 526701.

Example 2

The white bread dough formulation shown in Table II was made according to the procedures of Example 1. The resulting white bread product provided about 3.0 grams of digestible carbohydrates per 28.35 gram serving.

TABLE II

| | Ingredient | Formula Percent |
|---|---|---|
| 1. | Instant active Yeast | 1.00 |
| 2. | Water | 38.39 |
| 3. | Iodized table salt | 1.00 |
| 4. | High Gluten Bread Flour | 3.68 |
| 5. | Wheat Fiber | 4.17 |
| 6. | Vital Wheat Gluten | 20.65 |
| 7. | Hydrolyzed Wheat Protein | 4.37 |
| 8. | Corn Oil | 4.17 |
| 9. | Resistant Corn Starch-60 percent dietary fiber | 5.75 |
| 10. | Fungal Protease | 0.04 |
| 11. | Inulin | 5.34 |
| 12. | Lecithin | 0.27 |
| 13. | Whole Wheat Flour | 4.15 |
| 14. | Soy Flour-full fat | 4.15 |
| 15. | Sodium Caseinate | 1.87 |
| 16. | Baked Bread Flavor | 1.00 |
| | Total | 100.00 |

The hydrolyzed wheat protein was available from Manildra Milling Company as IWP 1100, having 85% gluten content and being about 3% hydrolyzed. The sodium caseinate was available from Erie Foods International. All other ingredients were those used in Example 1.

Example 3

The white bread dough formulation shown in Table III was made according to the procedures of Example 1. The resulting white bread product provided about 3.0 grams of digestible carbohydrates per 28.35 gram serving.

TABLE III

| | Ingredient | Formula Percent |
|---|---|---|
| 1. | Instant active Yeast | 1.00 |
| 2. | Water | 38.39 |
| 3. | Iodized table salt | 1.00 |
| 4. | High Gluten Bread Flour | 3.68 |
| 5. | Wheat Fiber | 4.17 |
| 6. | Vital Wheat Gluten | 20.65 |
| 7. | Hydrolyzed Wheat Protein | 4.37 |
| 8. | Corn Oil | 4.17 |
| 9. | Resistant Corn Starch-60 percent dietary fiber | 5.75 |
| 10. | Fungal Protease | 0.04 |
| 11. | Inulin | 5.34 |
| 12. | Lecithin | 0.27 |
| 13. | Whole Wheat Flour | 4.15 |
| 14. | Soy Flour-full fat | 4.15 |
| 15. | Soy Isolate Protein Supro 620 | 1.87 |
| 16. | Baked Bread Flavor | 1.00 |
| | Total | 100.00 |

The hydrolyzed wheat protein was available from Manildra Milling Company as IWP 1100, having 85% gluten content and being about 3% hydrolyzed. Soy Isolate Protein Supro 620 was available from Protein Technologies International of Saint Louis, Mo. All other ingredients were those used in Example 1.

Example 4

The white bread dough formulation shown in Table IV was prepared in a commercial horizontal dough blender. The water, yeast, and oil were added onto dry minors (ingredients 3, 10, 12, 13, 16 and 17) under mixing on low speed for 45 seconds. The remaining flour and dough conditioner ingredients were dropped and mixed on low for 1 minute and 15 seconds. After mixing an additional 12 minutes on high speed, the dough was divided into 525 g pieces, and allowed to rest for 5 minutes. The dough pieces were then shaped into a loaf, proofed at 110° F. for 55 minutes, and baked for 35 minutes on a moving belt a lower temperature of 410° F. and a top temperature of 370° F. The dough lost about 10% by weight in moisture during baking. The resulting white bread product provided about 3.0 grams of digestible carbohydrates per 28.35 gram serving.

TABLE IV

| | | |
|---|---|---|
| 1. | Creamed Yeast | 1.98 |
| 2. | Water | 38.00 |
| 3. | Iodized Table Salt | 0.99 |
| 4. | High Gluten Bread Flour | 3.62 |
| 5. | Wheat Fiber | 4.10 |
| 6. | Vital Wheat Gluten | 15.64 |
| 7. | Hydrolyzed Wheat Protein | 8.11 |
| 8. | Soy Oil | 4.10 |
| 9. | Resistant Corn Starch-60 percent dietary fiber | 5.63 |
| 10. | Fungal Protease | 0.04 |
| 11. | Inulin | 5.24 |
| 12. | Baked Bread Flavor | 0.25 |
| 13. | Lecithin | 0.25 |
| 14. | Whole Wheat Flour | 3.62 |
| 15. | Soy Flour/full fat | 3.62 |
| 16. | Calcium propionate | 0.30 |
| 17. | Citric Acid | 0.30 |
| 18. | Dough conditioner-HWG2009 | 2.21 |
| 19. | Dough conditioner-Arise ™ 5000 | 2.00 |
| | Total | 100.00 |

The creamed yeast ingredient was available as Eagle® Brand Creamed Yeast, from Lallemand Inc., of Ontario, Canada. The 75% vital wheat gluten, which passed the Gluten Hydration Test, was available from Cargill (The Netherlands). The hydrolyzed wheat protein was available from Manildra Milling Company as IWP 1100, having 85% gluten content and being about 3% hydrolyzed. The soy oil is free of trans fatty acid (non-hydrogenated). The HWG2009 and Arise™ 5000 dough conditioners were available from MGP Ingredients, Inc. (Atchison, Kans.).

Example 5

The high gluten bread dough according to the ingredients of Table V is made and baked according to the following procedure. In a large bowel, stir together 1½ cups of gluten flour with the remainder of dry ingredients (nos. 2-6). Add the hot water and vegetable oil, and mix at low speed for 2 minutes in a blade mixer. Add additional gluten flour, 1 tablespoon at a time, with continued mixing using the blade mixer until the dough wetness is such that it can be worked with the hands without sticking. Knead the dough with a dough hook for 15-20 minutes until the dough becomes smooth and elastic. Shape and place the dough in a greased pan and cover with a towel or plastic wrap, and proof at room temperature until the dough volume has doubled (within about 1 to 2 hours). Punch down the dough, place on a work surface and knead for ½ to 1 minute. Shape the dough into loaf form and place it in a loaf pan such that the dough takes up approximately ½ of the pan height. Allow the dough to further proof in the covered pan until the dough has reached the top edge of the pan, then place the pan in a preheated oven and bake at 350° F. for 25 minutes. Remove the baked bread from the oven and cool.

TABLE V

| | Ingredients |
|---|---|
| 1 | 2.5-3.0 cups vital wheat gluten-Protinax 132 |
| 2 | 0.5 cups hydrolyzed wheat protein-IWP 1100 |
| 3 | 1/3 cup non-fat dry milk |
| 4 | 1 package dry yeast |
| 5 | 2 teaspoons sugar |
| 6 | 2 teaspoons salt |
| 7 | 1-1/2 cup hot water |
| 8 | 1 tablespoon vegetable oil |

The resulting high gluten bread product provides 0 grams of digestible carbohydrates per 28.35 gram serving.

I claim:

1. A high protein, low digestible carbohydrate dough composition comprising:
   i) a protein component comprising, by weight of the dough composition:
      a) about 15% to about 25% vital wheat gluten, and
      b) about 3% to about 6% enzymaticly hydrolyzed wheat protein, the weight ratio of vital wheat gluten to hydrolyzed wheat protein is about 2.5:1 to about 8:1,
   ii) a carbohydrate component comprising, by weight of the dough composition:
      (1) about 5% to about 20% non-digestible carbohydrate material selected from the group consisting of dietary fiber, non-absorbent carbohydrate material, and mixtures thereof, and
      (2) 0% to about 15% digestible carbohydrate material selected from the group consisting of bread flours, monosaccharides, disaccharides, and digestible starch, and mixtures thereof, and
   iii) a liquid component comprising water.

2. The dough composition of claim 1 wherein the protein component further comprises a moisture-managing agent comprising a protein hydrocolloid.

3. The dough composition of claim 2 wherein the moisture-managing agent is selected from the group consisting of a caseinate, a soy protein isolate, and mixtures thereof, and the weight ratio of hydrolyzed wheat protein to the moisture-managing agent is from about 1:1 to about 10:1.

4. The dough composition of claim 1 wherein the protein component further comprises a protease enzyme.

5. The dough composition of claim 4 wherein the protease enzyme is a fungal protease enzyme.

6. The dough composition of claim 1 wherein the hydrolyzed wheat protein has a degree of hydrolysis of from about 1% to about 10%.

7. The dough composition of claim 1 wherein the average particle size of the dietary fiber is less than about 250 microns.

8. The dough composition of claim 7 wherein the average particle size of the dietary fiber is less than 50 microns.

9. The dough composition of claim 1 further comprising a dough conditioner.

10. The dough composition according to claim 6, wherein the hydrolyzed wheat protein has a degree of hydrolysis from about 1.0% to 3%.

11. The dough composition according to claim 3, wherein the caseinate is selected from the group consisting of sodium caseinate, potassium caseinate, calcium caseinate, magnesium caseinate, and mixtures thereof, and is present at a weight ratio of hydrolyzed wheat protein to caseinate of from about 2.5:1 to about 2:1.

12. The dough composition according to claim 3, wherein the soy protein isolate has a water absorption value of 200% and higher as determined by the farinograph method, AACC Method 54-21A, and a viscosity of 600 centipoise of more, as determined on a 15% solution with a Brookfield® viscometer at 25° C. and a shear rate of 10 sec$^{-1}$.

13. A high protein, low digestible carbohydrate bread product made by baking the dough composition according to claim 1.

14. The bread product according to claim 13 wherein the level of digestible carbohydrate material in the dough composition contributes less than 3.0 grams of digestible carbohydrate per 28.35 gm serving of the bread product.

15. The bread product according to claim 14 wherein the level of digestible carbohydrate material in the dough composition contributes less than 2.0 grams of digestible carbohydrate per 28.35 gm serving.

16. The dough composition according to claim 1, further composing a protease enzyme and leavening agent.

17. The bread product according to claim 13 wherein the level of digestible carbohydrate material in the dough composition contributes less than 7.0 grams of digestible carbohydrate per 28.35 gm serving of the bread product.

18. The bread product according to claim 17 wherein the level of digestible carbohydrate material in the dough composition contributes less than 5.0 grams of digestible carbohydrate per 28.35 gm serving of the bread product.

* * * * *

UNITED STATES PATENT AND TRADEMARK OFFICE
CERTIFICATE OF CORRECTION

PATENT NO. : 7,618,667 B2  Page 1 of 1
APPLICATION NO. : 10/319129
DATED : November 17, 2009
INVENTOR(S) : Anfinsen It is certified that error appears in the above-identified patent and that said Letters Patent is hereby corrected as shown below:

Col. 20, line 50, delete "wherein the" and insert --wherein an--.

Col. 20, lines 64-65, delete "200% and higher" and insert --at least 200%--.

Col. 20, line 67, delete "600 centipoise of more" and insert --at least 600 centipoise--.

Col. 22, line 2, delete "composing" and insert --comprising--.

Col. 22, line 2, insert --a-- between the words and and leavening.

Signed and Sealed this

Sixteenth Day of March, 2010

David J. Kappos
*Director of the United States Patent and Trademark Office*